(12) United States Patent
Bayer et al.

(10) Patent No.: US 7,479,208 B2
(45) Date of Patent: Jan. 20, 2009

(54) ELECTRODE FOR ELECTROCHEMICAL REDUCTION

(75) Inventors: Erwin Bayer, Dachau (DE); Martin Bussmann, Schwabhausen (DE); Thomas Kraenzler, Salem (DE); Albin Platz, Ried-Beindlkirch (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 350 days.

(21) Appl. No.: 11/206,342

(22) Filed: Aug. 18, 2005

(65) Prior Publication Data

US 2006/0037856 A1 Feb. 23, 2006

(30) Foreign Application Priority Data

Aug. 19, 2004  (DE) ..................... 10 2004 040 217

(51) Int. Cl.
*C25D 17/12* (2006.01)
(52) U.S. Cl. .................. 204/224 M; 204/225; 204/212; 204/218; 204/280

(58) Field of Classification Search ............. 204/224 M, 204/225, 212, 218, 280; 205/645, 648, 649, 205/651, 652, 653, 654, 663, 670, 686
See application file for complete search history.

(56) References Cited

U.S. PATENT DOCUMENTS

| 4,405,411 | A | * | 9/1983 | Inoue et al. | .................... 205/93 |
| 4,522,692 | A | * | 6/1985 | Joslin | .......................... 205/653 |
| 6,632,337 | B2 | * | 10/2003 | Platz et al. | .................. 204/280 |
| 6,680,454 | B1 | * | 1/2004 | Batzinger et al. | ........ 219/69.15 |

\* cited by examiner

*Primary Examiner*—Bruce F Bell
(74) *Attorney, Agent, or Firm*—Davidson, Davidson & Kappel, LLC

(57) ABSTRACT

An electrode (10) is provided for electrochemical reduction of a workpiece (20) that is to be treated. The electrode (10) has a predefined contour and contains an electrically conductive material. The electrically conductive material of the predefined contour forms an electrode core (12). The outside of the electrode core (12) is covered with an insulation layer (13). The insulation layer (13) is porous and is made of an electrically non-conductive material.

6 Claims, 2 Drawing Sheets

ELECTRODE FOR ELECTROCHEMICAL REDUCTION

This application claims priority to German Patent Application Serial No. DE 10 2004 040 217.5, filed Aug. 19, 2004, the entire disclosure of which is hereby incorporated by reference herein.

FIELD OF THE INVENTION

The present invention relates to an electrode for electrochemical reduction of a workpiece.

BACKGROUND

A method for exact and very precise treatment of surfaces is electrochemical reduction. In electrochemical reduction, the surface of the workpiece is generally processed using an electrode, and material is removed from the workpiece through electrochemical reaction of the workpiece with the electrolyte which is located between the workpiece and the electrode. In conventional methods of electrochemical reduction, the work is performed with gaps between the electrode and the workpiece which may be in the range of 1 mm to 2 mm. To produce finer structures and forms, the gap may be reduced to dimensions in the range of 10 μm to 50 μm and less.

In electrochemical reduction of this sort, the danger of an electrical contact between electrode and workpiece increases, as the electrode is brought closer to the workpiece. Such a contact would result in a local short circuit, which may result in damage both to the electrode and to the workpiece, so that not only the current workpiece but also subsequent workpieces may suffer from insufficient processing accuracy and precision, as well as insufficient stability of shape.

Methods are known in which detection of the distance between electrode and workpiece is determined by detecting the relationship between voltage and current during processing. In that case the occurrence of a short circuit should be prevented by electronic measures, in particular through appropriate regulation of the travel of the electrode. With a workpiece that exhibits local irregularities of the surface, in particular individual peaks that extend locally above the surface that is to be reduced, such regulation of the gap may fail and a local flashover may still occur. The associated damage to the electrode may also leave its mark on the workpiece being treated, even if the dimensions of the part in the short circuit situation were still sufficient.

SUMMARY OF THE INVENTION

An object of the present invention is therefore to supply an electrode with which short circuits cannot occur between electrode and workpiece.

An electrode for electrochemical reduction of a workpiece to be treated in accordance with an embodiment of the present invention has a predefined contour made of electrically conductive material. The electrically conductive material having the predefined contour forms the electrode core. An outer surface of the electrode core is covered with an insulation layer. The insulation layer is porous and is made of an electrically non-conductive material.

The insulation layer of electrically non-conductive material that surrounds the electrode core ensures that there cannot be any direct contact between electrode core and workpiece. The insulation layer therefore prevents the occurrence of a short circuit between these two parts. There is sufficient transition resistance between the electrode core and the workpiece, so that the current flow does not exceed a limiting value.

The porosity of the insulation layer makes it possible for the electrolyte, which surrounds the electrode and produces the electrical contact with the workpiece, to soak into the material of the insulation layer and enable a flow of current on beyond the pores and the porous areas to the workpiece. This limited flow of current enables eroding, and a stripping of material of the workpiece due to the erosion. The functionality of the electrode for electrochemical reduction is therefore not impaired by the insulation layer.

The presence of this insulation layer therefore prevents occurrence of a direct contact between the electrically conductive material of the electrode core and the workpiece under all circumstances and independent of the proximity and the surface structure of the workpiece, thereby preventing short circuits between the electrode and workpiece.

In accordance with an advantageous embodiment of the present invention, the porosity of the insulation layer is chosen so that a flow of current between electrode and workpiece is ensured. According to another advantageous embodiment, care is taken to ensure that there is a sufficient exchange of electrolyte in the area of the insulation layer. According to a further advantageous embodiment, the thickness of the insulation layer is chosen so that ground contact of the electrode core to the workpiece to be treated is avoided even if the surface is touched. The thickness of the insulation layer is thus dependent on the shape of the electrode, as well as on the voltage which is applied between workpiece and electrode. According to a more refined design, the thickness of the insulation layer may in particular be dimensioned so that the current which develops when there is surface contact between insulation layer and workpiece does not exceed a limit, i.e. so that a minimum resistance is maintained. The value is defined in particular so that the current flow does not result in damage to the electrode and the workpiece, but it is usually chosen to be greater than the maximum permissible current flow during ongoing processing under normal conditions. The thickness of the layer is then chosen so that while a desired distance is maintained between electrode core and workpiece, for example in the range from 10 μm to 50 μm, a current flow is set, namely the nominal operating current. This also ensures a favorable infeed and a favorable processing speed for the progression of the process.

In accordance with another advantageous embodiment of the present invention, the material of the insulation layer is an oxide layer such as aluminum oxide, zirconium oxide or silicon dioxide. Aluminum oxide and zirconium oxide are electrically insulating materials which, because of their mechanical hardness, protect the electrode from damage even if there is contact with the workpiece. As a thermally sprayed coating, aluminum oxide has a porous structure. Alternatively, the design may call for the insulation layer to be made of an organic coating. According to another alternative, the electrically non-conductive material of the insulation layer may also be a ceramic material such as carbide, nitride or a mixed ceramic having an oxide, carbide and/or nitride portion, such as in particular a coating of the type TiAlON. Designing the insulation layer of wear-resistant hard materials having an organic binder also corresponds to an advantageous alternative. The electrically non-conductive material of the insulation layer according to an advantageous embodiment may be a layer that has grown on the surface through oxidation.

In accordance with another advantageous embodiment of the present invention, the thickness of the insulation layer is chosen to be slight, as long as it continues to fulfill its task as a current-limiting layer. This keeps the transition resistance which is formed by the insulation layer as low as possible. Thicknesses of an insulation layer here according to a preferred embodiment are under 100 μm, in particular under 50 μm, and preferably even under 10 μm. By keeping layers and layer thicknesses as thin as possible, it continues to be possible to bring the electrode with the electrically conductive electrode core very close to the surface of the workpiece being treated, and thus the fineness of the structure sizes attained by the electrochemical reduction is not enlarged unnecessarily. Avoidance of a short circuit upon contact should still be guaranteed, however.

In accordance with an advantageous embodiment of the present invention, if the electrode has a supply channel in its core for the electrolyte. The supply channel ends in a surface section of the electrode, which has a hole pattern through which the electrolyte is able to reach the outside of the electrode. At least in the area of the hole pattern, which extends in particular over at least the majority of the face of the electrode facing the workpiece, there is a porous intermediate layer to the outside of which the insulation layer is attached. After passing through the holes of the hole pattern in the porous intermediate layer, the electrolyte becomes evenly distributed over the surface, and then emerges from the electrode through the insulation layer, which is also porous. According to a preferred design, the intermediate layer is in the form of a thermal sprayed coat, metal felt or porously sintered metal.

It also corresponds to a preferred embodiment of the present invention if a force sensor is assigned to such an electrode, in particular if a force sensor is integrated into the electrode. A force acting on the electrode is detectable through the force sensor, and thus a contact between the surface of the electrode, namely the insulation layer, and the workpiece may be ascertained. This is then independent of the course of the flow of current between electrode and workpiece. Thus an independent mechanical measurement of a collision between electrode and workpiece is made possible.

DETAILED DESCRIPTION

Figure 1:
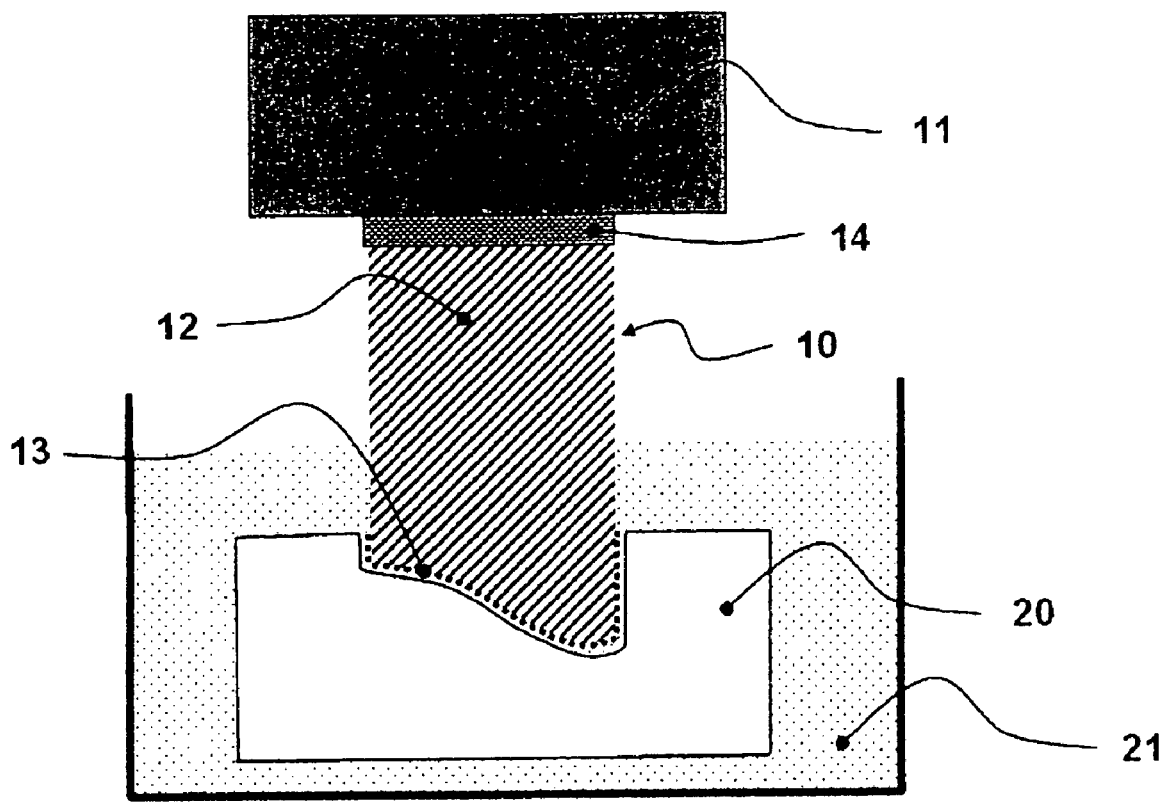
FIG. 1 shows a first exemplary embodiment of a device for electrochemical reduction.

FIG. 1 shows a schematic representation of a device for electrochemical reduction of a workpiece 20. To reduce the workpiece, it is placed in a bath of an electrolytic fluid 21.

Electrode 10 is held with an electrode holder 11, which is movable and thus is able to process the surface of workpiece 20 in a specific manner through electrochemical reduction, using electrode 10. Electrode 10 is made up in this case of electrically conductive core 12, which is enclosed in insulation layer 13 (not shown to scale). Electrolyte 21 is able to penetrate through this insulation layer 13 to electrode core 12, and thus to enable a flow of electrical current from electrode core 12 to workpiece 20. The electrode core is connected to a source of electrical voltage through tool receptacle 11 in a manner that is not shown. Workpiece 20 is kept grounded within the electrolyte bath, so that a flow of electric current forms between workpiece 20 and electrode core 12.

Force sensor 14 is located between electrode core 12 and tool receptacle 11. Force sensor 14 detects any mechanical forces which may act on electrode 10, and these mechanical forces are only able to appear if electrode 10 and workpiece 20 touch. Such contacts are to be avoided for the sake of a uniformly regulated procedure, and appropriate countermeasures may be initiated in the control of the motion of electrode 10, depending on the force detected by the force sensor.

Figure 2:
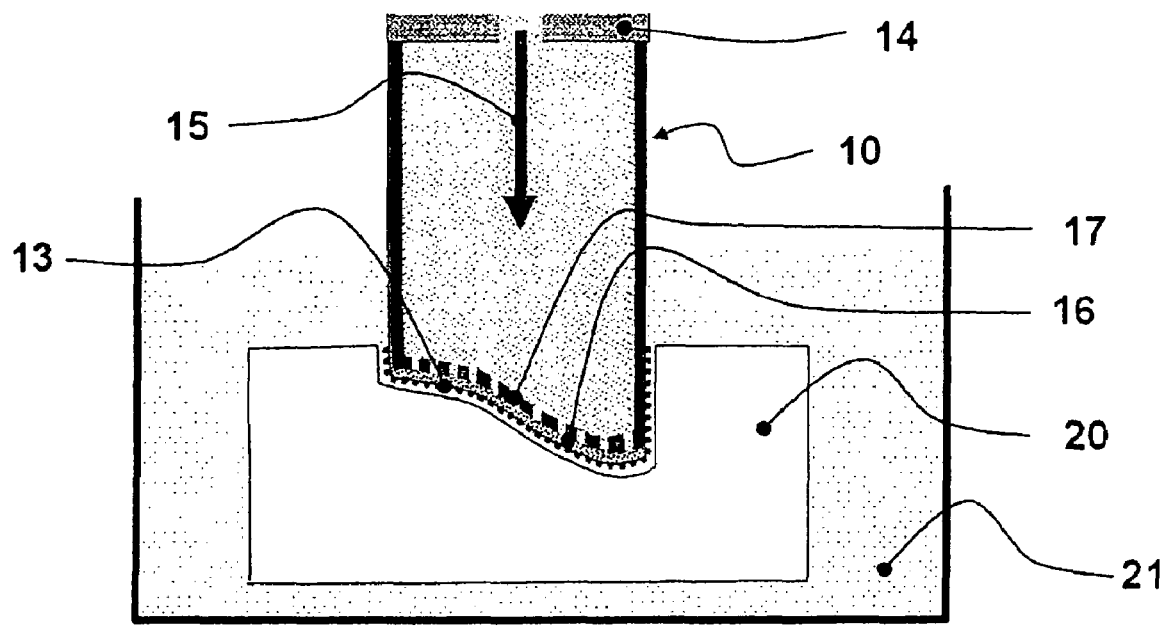
FIG. 2 shows a second exemplary embodiment of a device for electrochemical reduction, having an electrolyte supply system implemented in the electrode.

FIG. 2 shows a schematic representation of another supplemental device for electrochemical reduction of a workpiece 20, with the electrolyte supplied in the electrode.

The inside of electrode 10 is hollow, and electrolyte 5 is fed in internally in the electrode. The electrolyte is conveyed through a hole pattern 17 from the electrode into a porous, electrically conductive intermediate layer 16, which advantageously provides for uniform emergence of the electrolyte. Intermediate layer 16 has an electrically insulating, porous coating 13. This insulation layer 13 effectively prevents the occurrence of a short circuit between electrode 10 and component 20.

What is claimed is:

1. An electrode, comprising an electrode core, a porous intermediate layer, and an insulation layer, the electrode core having a supply channel therein for an electrolyte, the electrolyte being introducible from the supply channel through a hole pattern in the electrode core into the porous intermediate layer, the insulation layer being attached to an outside surface of the porous intermediate layer.

2. The electrode as recited in claim 1, wherein the intermediate layer is one of a thermal sprayed coat, a metal felt, and a porously sintered metal.

3. The electrode as recited in claim 1, wherein the thickness of the insulation layer is less than 100 μm.

4. The electrode as recited in claim 1, wherein the thickness of the insulation layer is less than less than 50 μm.

5. The electrode as recited in claim 1, wherein the thickness of the insulation layer is less than less than 10 μm.

6. An apparatus including the electrode as recited in claim 1, and further including a force sensor, the force sensor detecting a contact between the electrode core and a workpiece undergoing electrochemical reduction.

* * * * *